United States Patent [19]

Gyger

[11] Patent Number: 5,495,933
[45] Date of Patent: Mar. 5, 1996

[54] CHAIN DRIVEN PALLET ACCUMULATING OVER/UNDER CHAIN CONVEYOR

[75] Inventor: Jack D. Gyger, Charlotte, Mich.

[73] Assignee: Roberts Sinto Corporation, Lansing, Mich.

[21] Appl. No.: 437,519

[22] Filed: May 9, 1995

Related U.S. Application Data

[63] Continuation of Ser. No. 49,343, Apr. 21, 1993, abandoned.

[51] Int. Cl.$^6$ .................................................. B65G 37/00
[52] U.S. Cl. ..................... 198/465.3; 198/803.2
[58] Field of Search ........................ 198/465.3, 803.2, 198/795, 465.1, 803.01

[56] References Cited

U.S. PATENT DOCUMENTS

| | | | |
|---|---|---|---|
| 2,844,241 | 7/1958 | King | 198/465.3 |
| 4,062,444 | 12/1977 | Nakov et al. | 198/803.2 |
| 4,088,220 | 5/1978 | Jacksch et al. | 198/465.3 X |
| 4,598,818 | 7/1986 | Miller | 198/803.2 |
| 4,776,453 | 10/1988 | Miller | 198/803.2 |
| 4,793,261 | 12/1988 | Schwaemmle | 198/803.01 X |
| 4,896,763 | 1/1990 | Hordyk et al. | 198/803.2 |
| 4,934,515 | 6/1990 | Linden | 198/465.3 X |
| 5,029,691 | 7/1991 | Fein et al. | 198/465.3 X |
| 5,070,996 | 12/1991 | Schwaemmle et al. | 198/465.3 |
| 5,178,261 | 1/1993 | Matheson et al. | 198/803.2 |

FOREIGN PATENT DOCUMENTS

| | | | |
|---|---|---|---|
| 462878 | 12/1991 | European Pat. Off. | |
| 2660293 | 10/1991 | France | 198/803.2 |
| 2712214 | 9/1978 | Germany | 198/465.3 |
| 3445249 | 6/1986 | Germany | 198/803.2 |
| 3539303 | 5/1987 | Germany | 198/803.2 |
| 1407765 | 7/1988 | U.S.S.R. | 198/465.3 |

*Primary Examiner*—D. Glenn Dayoan
*Attorney, Agent, or Firm*—John R. Benefiel

[57] ABSTRACT

An over/under pallet accumulating chain conveyor is described in which the pallets are supported on the center roller strand of triple roller strand chain loops to achieve a balanced loading of the chain pins. The pallets have sets of roller pairs engaged by a pallet drive disc having pockets receiving the rollers to drive the pallets around the chain sprocket axes, the pallets returning inverted on the return chain loop segments. The pallets can be linked together to accommodate larger sized workpieces. For declined conveyors, anti-runaway dogs carried by the carrier positively engage the chain.

14 Claims, 11 Drawing Sheets

CHAIN DRIVEN PALLET ACCUMULATING OVER/UNDER CHAIN CONVEYOR

This is a continuation of application Ser. No. 08/049,343 filed on Apr. 21, 1993, which is abandoned.

BACKGROUND OF THE INVENTION

This invention concerns conveyors of the type in which pallets are frictionally driven in an advancing direction by one or more loops of recirculating drive chain, and in which the pallets are returned around a sprocket at either end of the conveyor and are carried back to the beginning of the conveyor on the return segment of the drive chain extending beneath the upper segment of the chain.

Such conveyors are described in U.S. Pat. Nos. 4,681,212; 4,598,818; 4,062,444; 4,793,261; 4,776,453; 4,088,220; and 4,896,763.

In these prior designs the typical arrangement as shown in U.S. Pat. Nos. 4,088,220 and 4,598,818 has involved the use of a triple roller strand chain in which two roller strands are supported from above and below on guide bars, with the third roller strand projecting inwardly and on which the pallets are supported.

This arrangement results in a cantilever loading of the chain pins interconnecting each of the chain roller strands, resulting in bending forces being exerted on the chain pins, which cantilever loading can result in bending of the chain pins as when shock loading occurs.

The guide bar arrangement is relatively complex since the chain must be supported both from above and below, increasing the cost of construction of such conveyors.

The cantilever loading also can result in increased frictional loads exerted between the pallet and inside chain strand which requires greater horsepower to drive the chain, as in such conveyors, the accumulating feature is provided by the slippage of the chain beneath the pallets whenever the lead pallet is stopped.

U.S. Pat. 4,062,444 describes an arrangement for center loading the chain, but only in the advancing direction.

In such prior over/under pallet chain conveyors, the pallet must be driven at the end points of the conveyor as by sprocket drives such as to be able to be returned on the lower return segment of the conveyor chain. In many of these prior designs, as in U.S. Pat. Nos. 4,088,220 and 4,598,818, wedging to the chain is used to establish a positive drive at the sprocket.

These arrangements for driving the pallets around the sprockets have limited the sizing of the pallets such that conveyor designs for large parts have not been practical.

U.S. Pat. No. 4,793,261 describes a separate pallet drive disc which engages elements on the pallet, but lower track elements are required to guide the pallets around the disc axis and the pallets are mounted on wheels and driven by chain dogs.

Accordingly, it is an object of the present invention to provide an over/under chain pallet conveyor of the type described in which the loading of the chain is symmetrical in both the advancing and return directions to eliminate the cantilever loading of the chain pins and to decrease the frictional loads created by driving of the pallets by the chain during accumulation, as well as to simplify the construction of the conveyor.

It is another object of the present invention to provide such over/under accumulating pallet chain conveyor in which an arrangement for positive driving of the pallets accommodates a linking of pallets together to be able to accommodate larger sized workpieces and does not require guide tracks for the pallets.

SUMMARY OF THE INVENTION

These and other objects of the present invention which will become apparent upon reading of the following specification and claims are accomplished by a loading and guiding of a triple roller strand chain in which the inside and outside chain roller strands are supported by sets of lower spaced fixed guide bars supported along either side of the conveyor frame.

The underside of each pallet is provided with guide bars which are located to ride in a respective center roller strand of the triple strand conveyor chain extending along either side of the conveyor frame.

The chain is driven by a pair of drive sprockets located at the drive end of the conveyor and engaging the outside roller strand of the associated chain loop with an idler sprocket pair located at the opposite end of the conveyor. In addition to the chain drive sprockets, there is a pallet drive disc rotated coaxially with each of the drive sprockets and each pallet drive aligned disc is with the inside roller strand of a respective drive chain loop.

The pallet drive discs are formed with a series of radiused pockets circumferentially spaced about the rim of the drive disc.

Each pallet is provided with sets of engagement features comprised of a pair of pallet rollers mounted beneath and on either side of the pallet. Each pair of pallet rollers is joined with a connecting bar. The sets of pallet rollers on either side are aligned with a respective pallet drive disc so that the leading roller in each pair moves into a first radiused pocket on the respective pallet drive disc, pulling the pallet forward and around the axis of the pallet drive disc. The trailing roller in each roller pair thereafter moves into a second radiused pocket in a respective pallet drive disc located such as to receive the second pallet roller as the disc is rotated about its axis.

The connecting bar is formed with curved corners which align with the rim of the associated pallet drive disc with the rollers fully seated in the disc pockets.

By overlayment of the center roller strand of the conveyor chain atop the curved corners, the pallet rollers are held within the radiused pockets as the pallet rotates about the axis to be inverted and headed in the return direction.

Since the pallet roller connecting bars are engaged by the center roller strands of the drive chain associated therewith, the center roller strand continues to support the weight of the pallet as the pallet moves off the lower side of the pallet drive disc and is returned, frictionally driven on the center roller strand of the associated chain loop.

The center roller strand of the drive chain is supported such as to allow free roller rotation so that minimal frictional loading results upon arresting the movement of the lead pallet during accumulation, to minimize the horsepower required to drive the triple strand conveyor chain.

The pallets may be interconnected by means of a linking bar which spaces successive pallets in linked pairs at the same pitch as the space between the pallet roller pairs on each pallet such that the linked pairs of pallets may be successively driven around the sprockets, enabling much larger work pieces to be supported by the pallets by linking successive pallets into groups of two or more of the associated linked pallets.

The pallet rollers may idle upon engaging the pallet drive disc portions intermediate the radiused pockets until a pocket moves into alignment with the lead pallet roller.

Alternatively, limit switches can be employed in conjunction with a pallet stop during accumulation such as to time the release of a pallet with the movement of a radiused pocket into proper position to accept the lead roller as it arrives after release to minimize the contact between the pallet drive sprocket and the pallet roller.

For declined conveyors, anti-runaway dogs are provided on the pallets, which pivot to engage the chain and prevent the pallets from moving ahead on the chain. The dogs are inclined to allow the chain to move past the pallets when the pallets come to rest.

DETAILED DESCRIPTION

In the following detailed description certain specific terminology will be employed for the sake of clarity and a particular embodiment described in accordance with the requirements of 35 USC 112, it is to be understood that the same is not intended to be limiting and indeed should not be so construed inasmuch as the invention is capable of taking many forms and variations within the scope of the appended claims.

Figure 1:
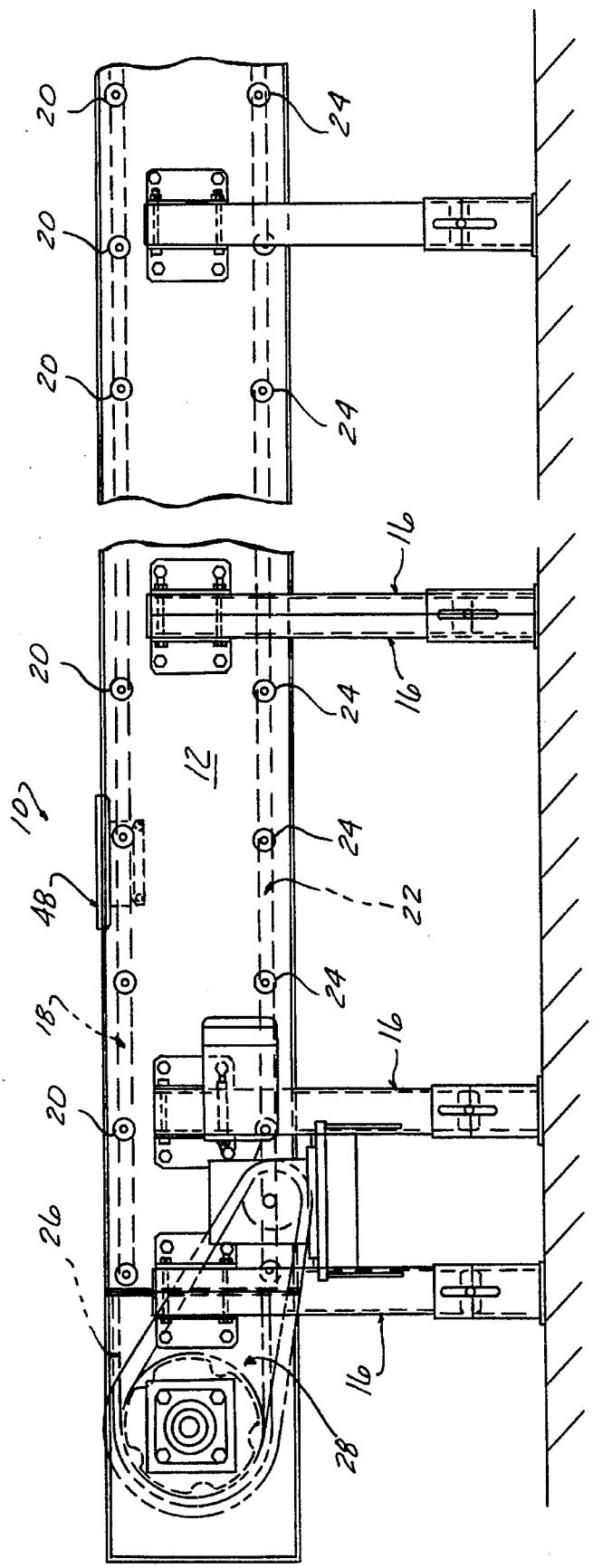
FIG. 1 is a side elevational view of an over/under chain driven pallet accumulating conveyor according to the present invention.
Figure 2:
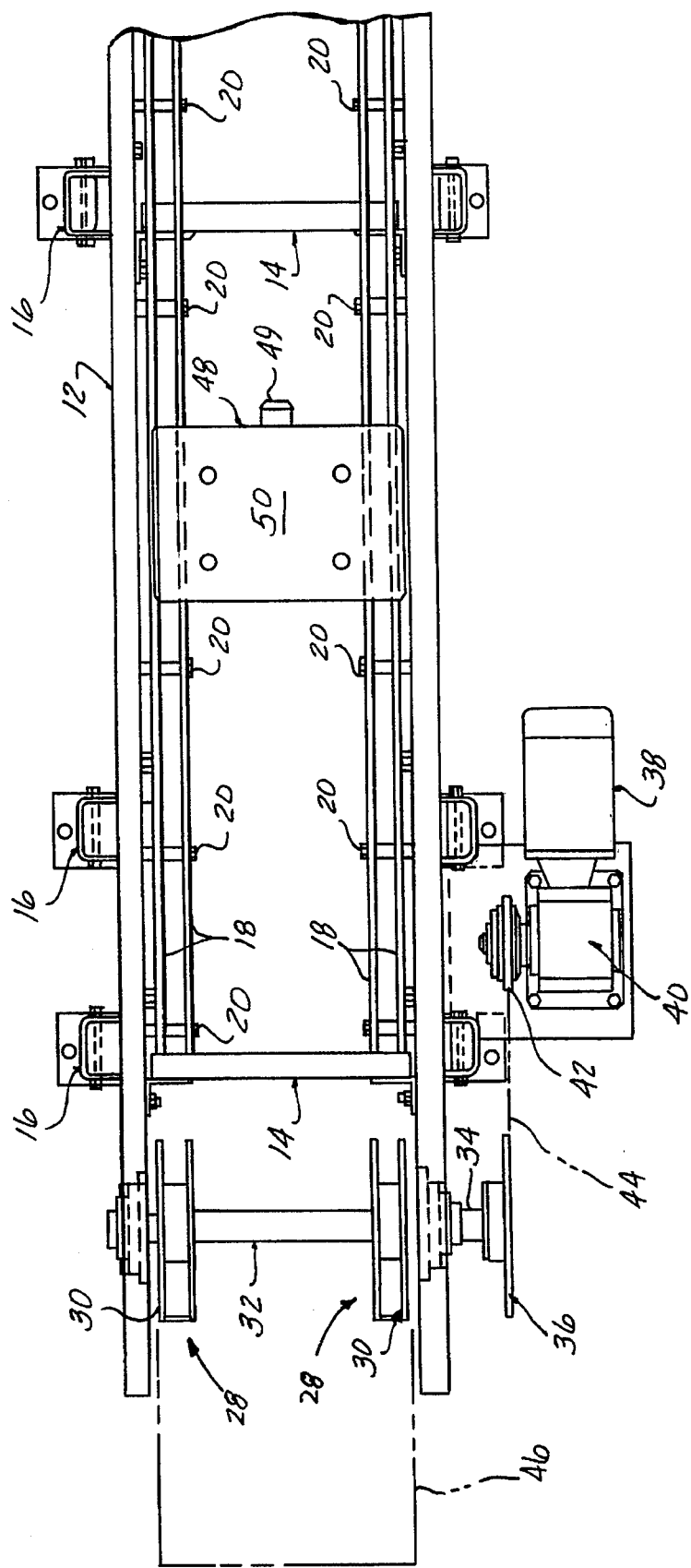
FIG. 2 is plan view of the head section of the conveyor shown in FIG. 1.
Figure 3:
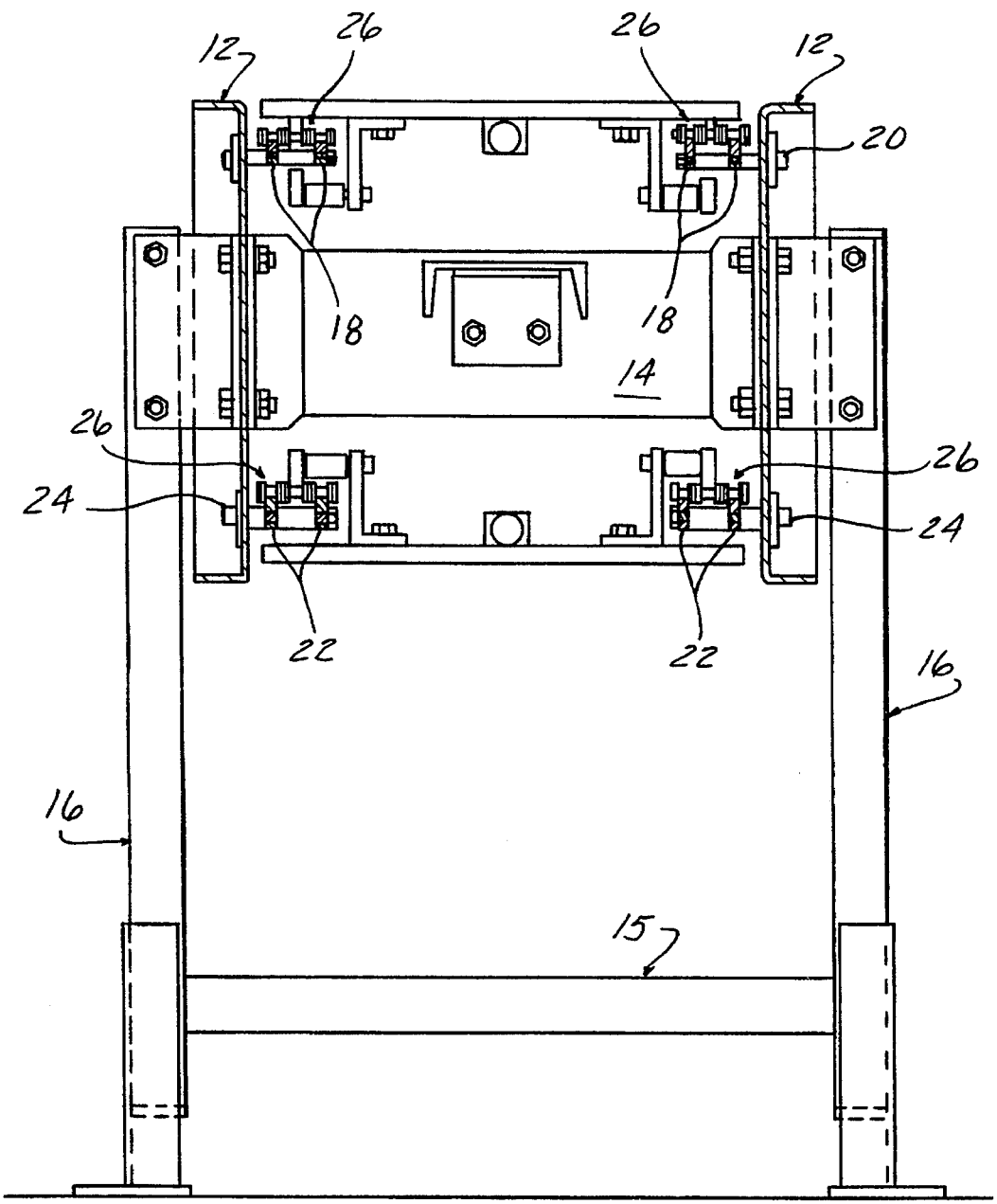
FIG. 3 is a sectional view of the conveyor shown in FIGS. 1 and 2.

Referring to the drawings and particularly FIGS. 1 through 3, the conveyor 10 according to the present invention includes a conveyor frame comprised of a pair of flanged side plates 12 connected together with cross pieces 14. The side pieces are supported above the floor by a series of legs 16 connected to each side plate 12.

A pair of sets of two spaced upper chain guide bars 18 are affixed to be spaced inwardly from each side plate 12 by a series of bolt-spacer post assemblies 20 spaced along each of the side plates 12. Spaced pairs of sets of lower chain guide members 22 are also affixed to the inside of each side plate 12 affixed thereto by a series of bolt spacer post assemblies 24 extending inwardly from each side plate 12.

Two loops of triple roller strand conveyor chain 26 extend the length of the conveyor with the upper segments of each riding atop the sets of upper chain guide bars 18 and lower segments thereof riding along lower chain guide bars 22.

The conveyor chain loops 26 pass around head sprocket assemblies 28 located at the left in FIGS. 1 and 2 with the other end passing around tail or idler sprocket assemblies 52 shown in FIGS. 4 and 5 described below. The chain conveyor loops 26 are triple roller strand, each of the triple roller strand conveyor chain loops 26 comprising three roller strands described below in further detail, the inner and outer roller strands riding atop the respective guide bars 18 and 22.

The head section sprocket assembly 28 is adapted to be power driven to create the recirculation of conveyor chain loops 26. For this purpose, the head section sprocket assembly 28 includes outside chain drive sprocket wheels 30 adapted to engage the outermost roller strand of an associated conveyor chain loop 26. The sprockets 30 are mounted on the cross shaft 32 which includes an outer section 34 having a drive sprocket 36 affixed thereto. A drive motor 38 is mounted alongside the conveyor side plates on one side with a right angle gear reducer 40 driven thereby to drive a reduction drive sprocket 42, which, via a power chain 44, drives the larger diameter sprocket 36. An appropriate shield, shown in phantom at 46, encloses the chain and power sprockets.

A series of pallets 48 are positioned atop the upper segments of the chain loops 26. Each pallet 48 comprises a planar body 50 adapted to have workpieces mounted thereto. Each pallet 48 extends across the width of the conveyor and rides atop the upper segments of the conveyor chain loops 26 and is adapted to be advanced by frictional engagement with the center roller strands of the chain loops 26.

As will be described in further detail hereinafter, the pallets 48 are advanced around the sprocket assemblies and return riding inverted atop the lower segments of the conveyor chain loops 26.

Figure 4:
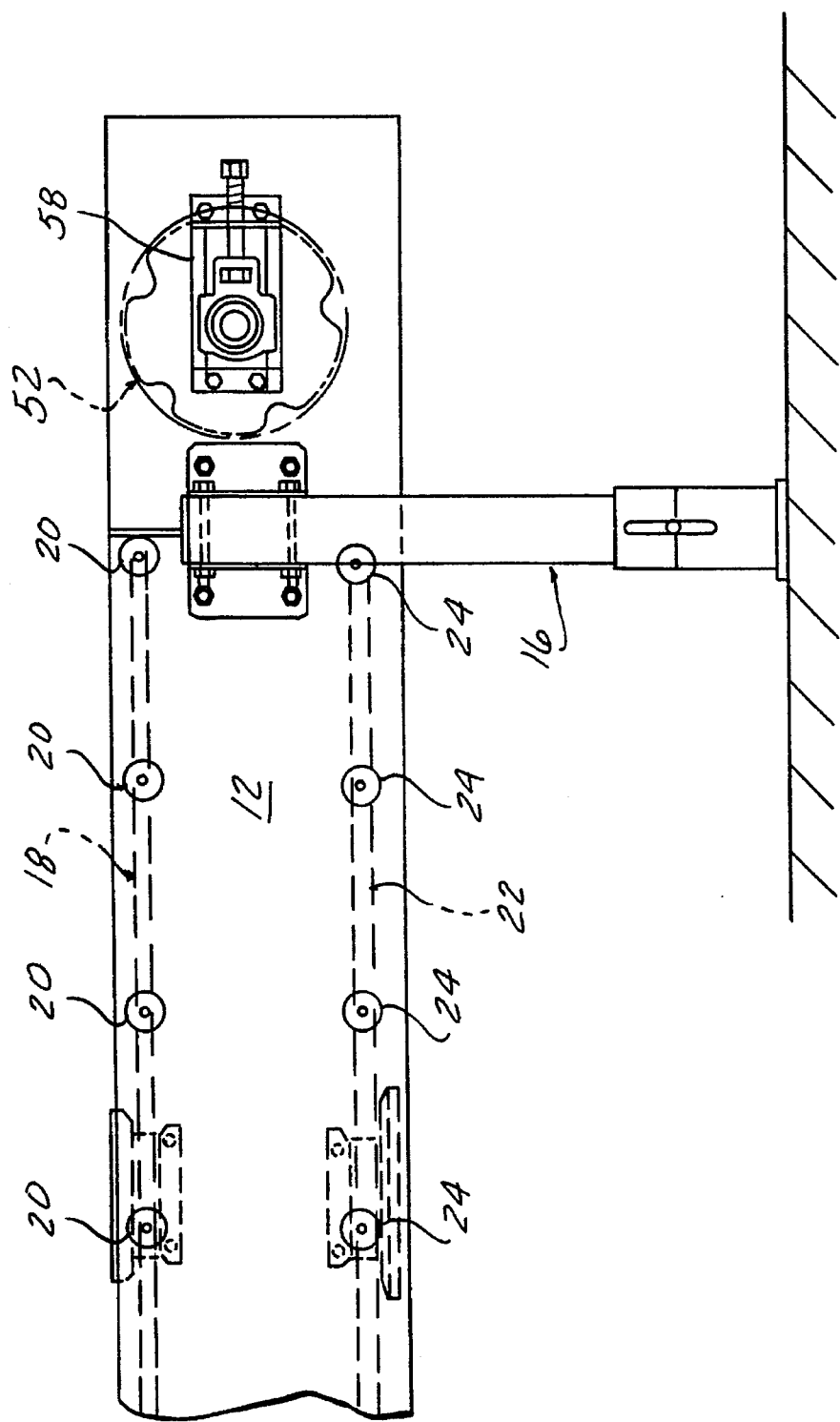
FIG. 4 is a side elevational fragmentary view of a tail section of the conveyor according to the present invention.
Figure 5:
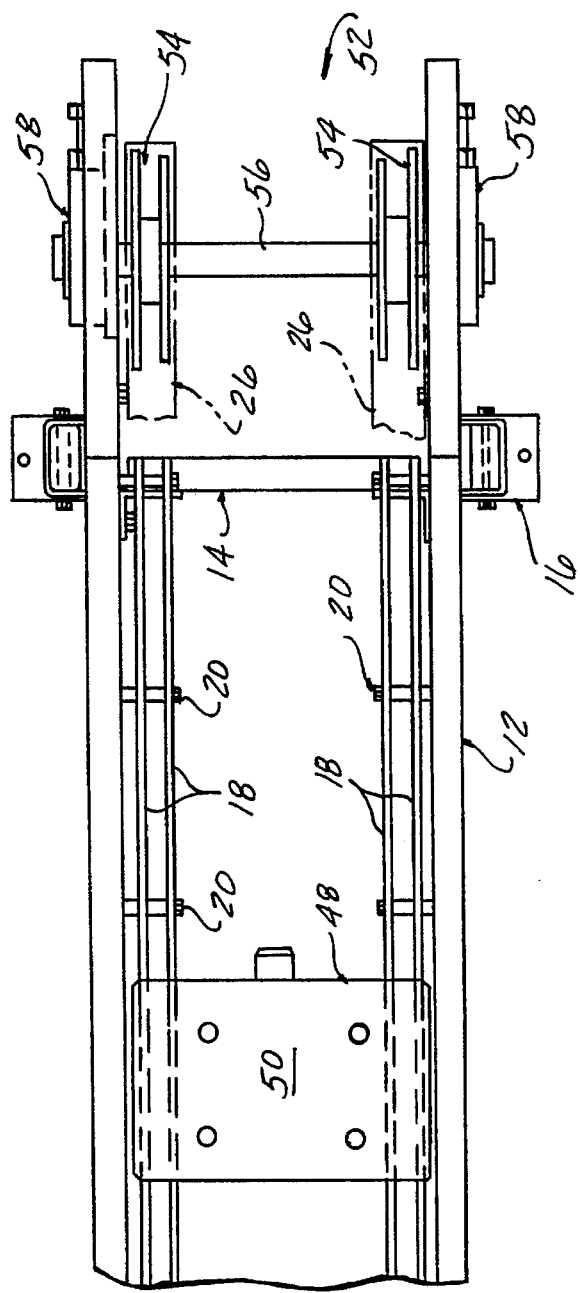
FIG. 5 is a fragmentary plan view of the tail section of the conveyor as shown in FIG. 4.
Figure 5:
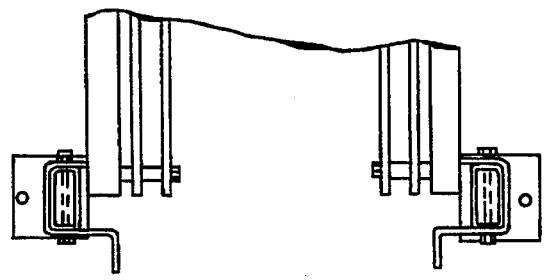

Referring to FIGS. 4 and 5, the tail section of the conveyor is illustrated which includes an idler sprocket assembly 52. The idler sprocket assembly 52 includes a chain sprocket 54 associated with each chain loop 26 affixed to a cross shaft 56 supported in suitable bearings. Each end of the sprocket cross shaft 56 is supported by means of a spring loaded tension adjustment mechanism 58 which enables the proper tensioning of each of the chain loops 26.

Figure 6:
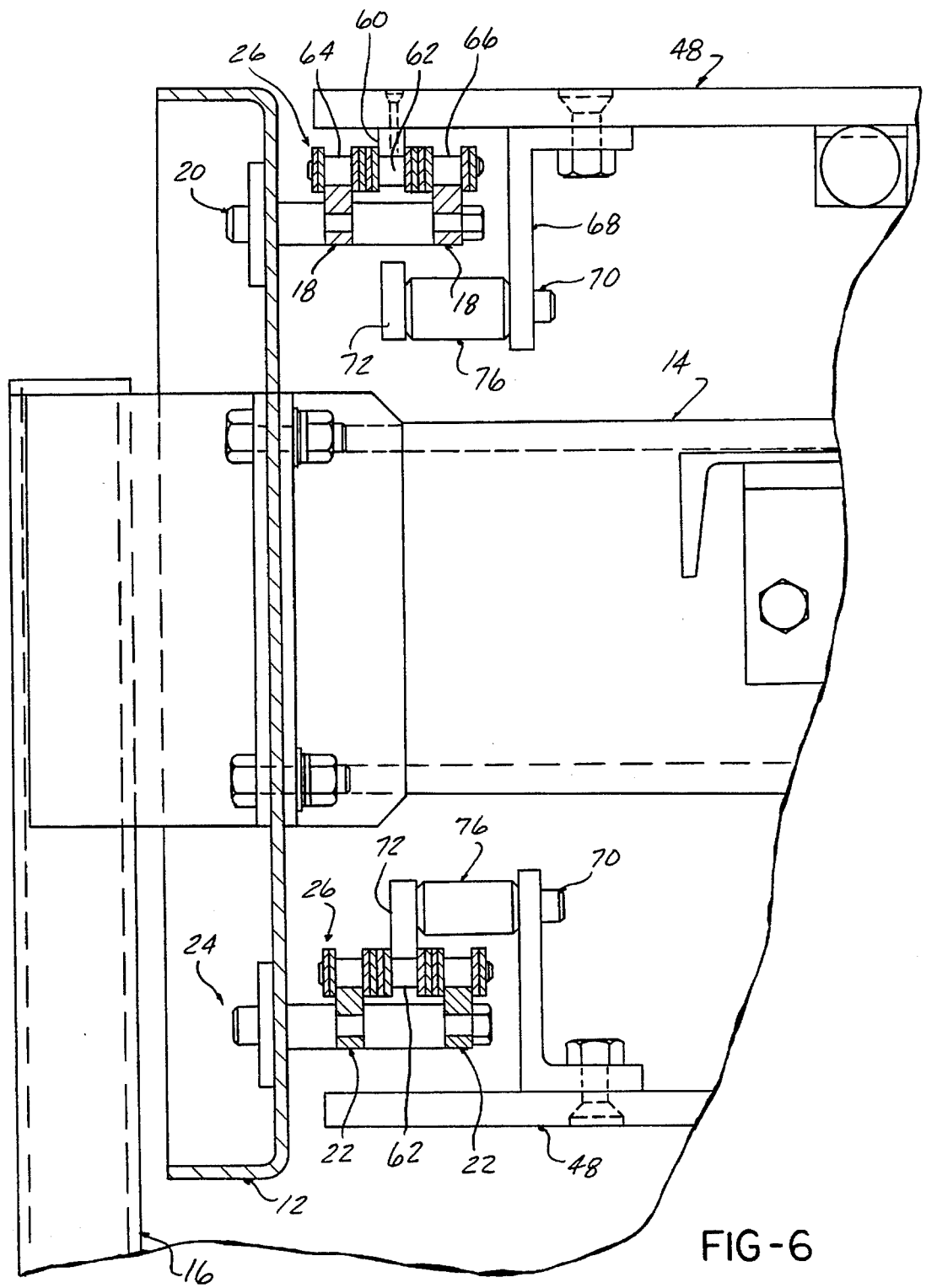
FIG. 6 is an enlarged fragmentary intermediate cross sectional view of the conveyor shown in FIGS. 1 and 2, with an advancing and returning pallet shown in position on the upper and lower sections of the conveyor chain loops.
Figure 9:
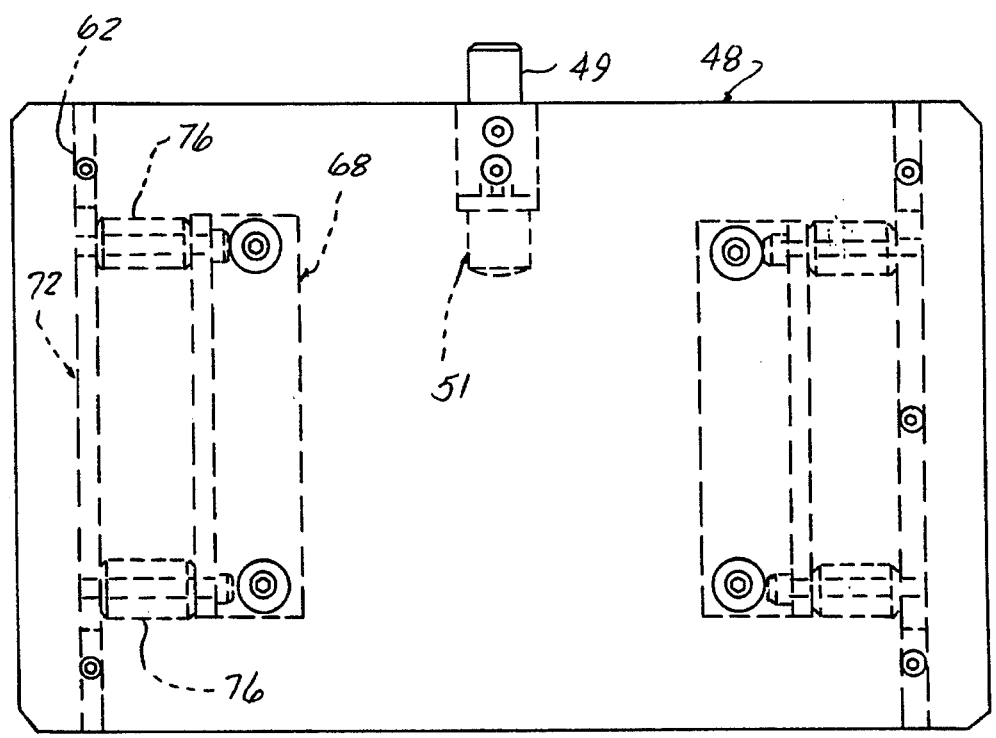
FIG. 9 is a plan view of the pallet shown in FIG. 10.

Referring to FIGS. 6 and 9, further details of construction can be seen. Each pallet 48 has a pallet guide bar 60 of hardened steel fastened to the underside thereof and located so as to ride on the center roller strand 62 of each chain loop 26. The outer and inner strand rollers 64 and 66 are aligned with and ride on the upper fixed guide bars 18 and accordingly there is a balanced loading of the triple strand conveyor chain 26 to avoid the cantilever bending loading described with respect to the prior art.

Each pallet 48 also has an aluminum angle 68 affixed to the underside to project downwardly therefrom. The lower leg of each of the aluminum angles 68 has a cap screw 70 fixing a lower pallet guide bar 72 aligned beneath the center roller 62 of each of an associated conveyor chain loop 26. The lower pallet guide bar 72 engages the center roller 62 with the pallet 48 in its returning movement.

Each pallet 48 has a bumper 49 mounted at the front to cushion the impacts as the pallet 48 bumps during accumulation. A stop block 51 is also provided affixed to the underside of each pallet 48 adapted to be engaged by a pallet stop mechanism, described below.

Figure 7:
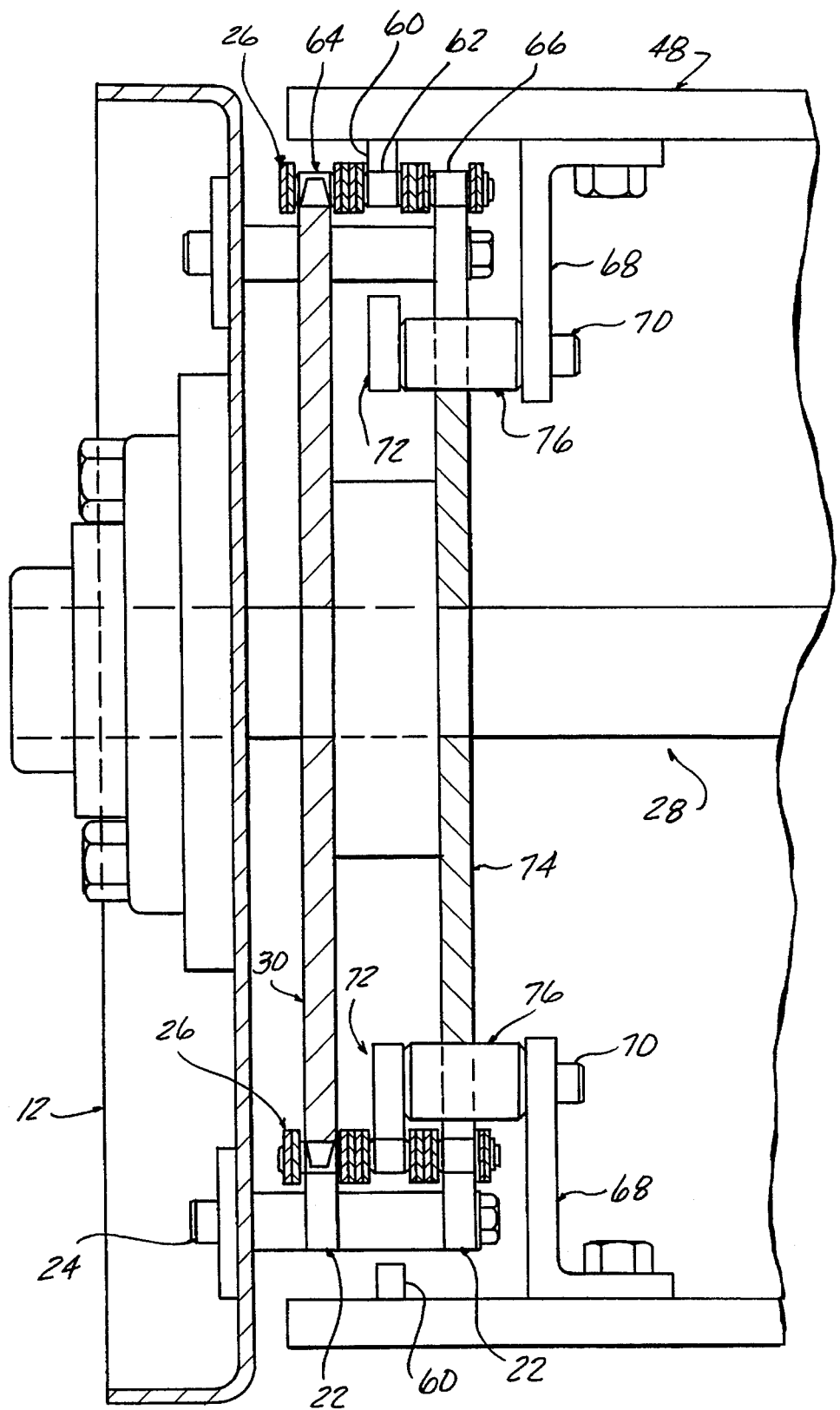
FIG. 7 is an enlarged fragmentary cross sectional view of the conveyor taken through the chain drive sprocket and pallet drive disc.

Referring to FIG. 7, each drive sprocket assembly 28 also includes a pallet drive disc 74, each spaced inwardly from a respective chain drive sprocket 30. Each angle 68 affixed below each pallet 48 also mounts a urethane roller 76 mounted on the mounting bolt 70. Each roller 76 extends across the plane of an associated pallet drive disc 74.

Figure 8:
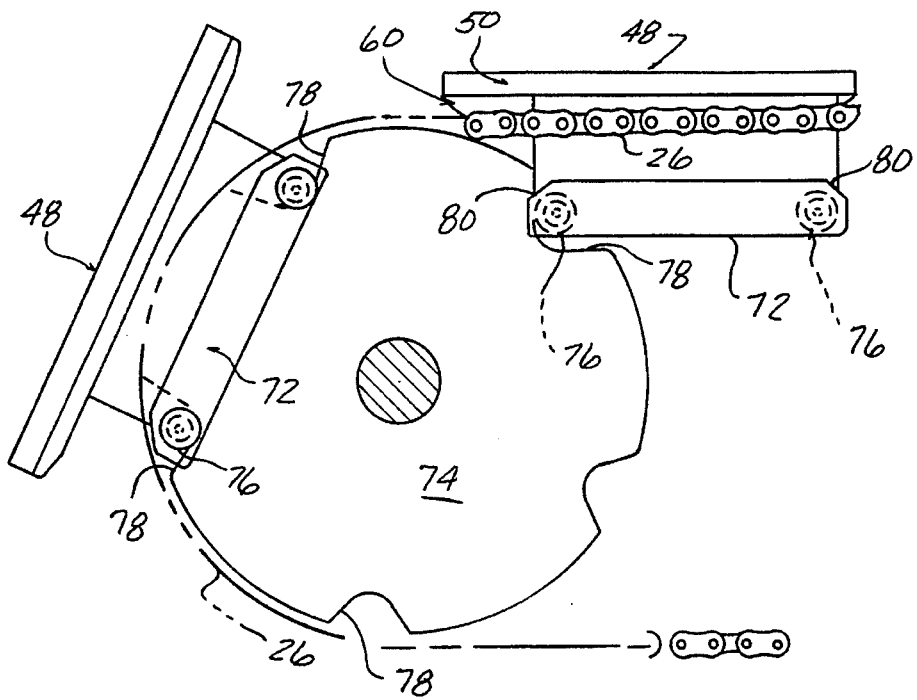
FIG. 8 is a side elevational view of the pallet drive disc and associated triple roller strand chain illustrating the advance of successive pallets to be driven about the pallet drive disc.

Referring to FIG. 8, each pallet drive disc 74 is provided with a series of spaced radiused pockets 78 recessed into the perimeter thereof, the circumferential spacing between successive pockets 78 corresponding to the lengthwise distance, i.e., the front to rear distance, between each pair of pallet rollers 76. The pallet lower guide bars 72 extend such as to connect the respective pairs of pallet support rollers 76.

The radiused pockets 78 are configured at their bottom to be complementary to the outside diameter of the roller 76.

Accordingly, as each pallet is driven to the left by frictional contact with the center roller strands 62 of each of the conveyor chain loops 26, and upon presentation of one of the pockets 78, the lead roller 76 moves into the pocket 78 as shown in FIG. 8. As the pallet drive disc 74 rotates, the lead roller 76 engages the trailing side wall of the engaged radiused pocket 78 such as to be advanced with rotation of the pallet drive disc 74. As the next trailing radiused pocket 78 rotates around into alignment with the trailing guide roller 76, the trailing pallet drive roller 76 also passes into the respective radiused pocket 78 and the pallet drive disc 74.

The corners 80 of the connecting lower guide bar 72 are radiused slightly to match the curvature of the outer rim of the pallet drive sprocket disc 74. The radiused corners 80 become aligned with the rim curvature of the pallet drive disc 74 with both drive rollers 76 fully seated in a respective radiused pocket 78. The corners 80 are aligned with the center roller strand 62 of the respective conveyor chain loops 26, such that contact therewith with the chain wrapped around the rim of the pallet drive disc 74 holds the pallet drive rollers 76 fully seated in the radius pockets 78.

As the pallet drive discs 74 rotate the particular pallet 48 around to the inverted position, the chain 26 separates from the rim of the pallet drive disc 74 and the rollers 76 are allowed to exit the respective radiused pockets 78 as the chain 26 advances away from the disc 74, riding inverted with the connecting guide bar 72 located in center roller strand 62 of each associated conveyor chain loop 26. Since the guide bar corners 80 are already in contact, a smooth movement of the pallets 48 onto the lower segment of the chain loops 26 results.

Figure 10:
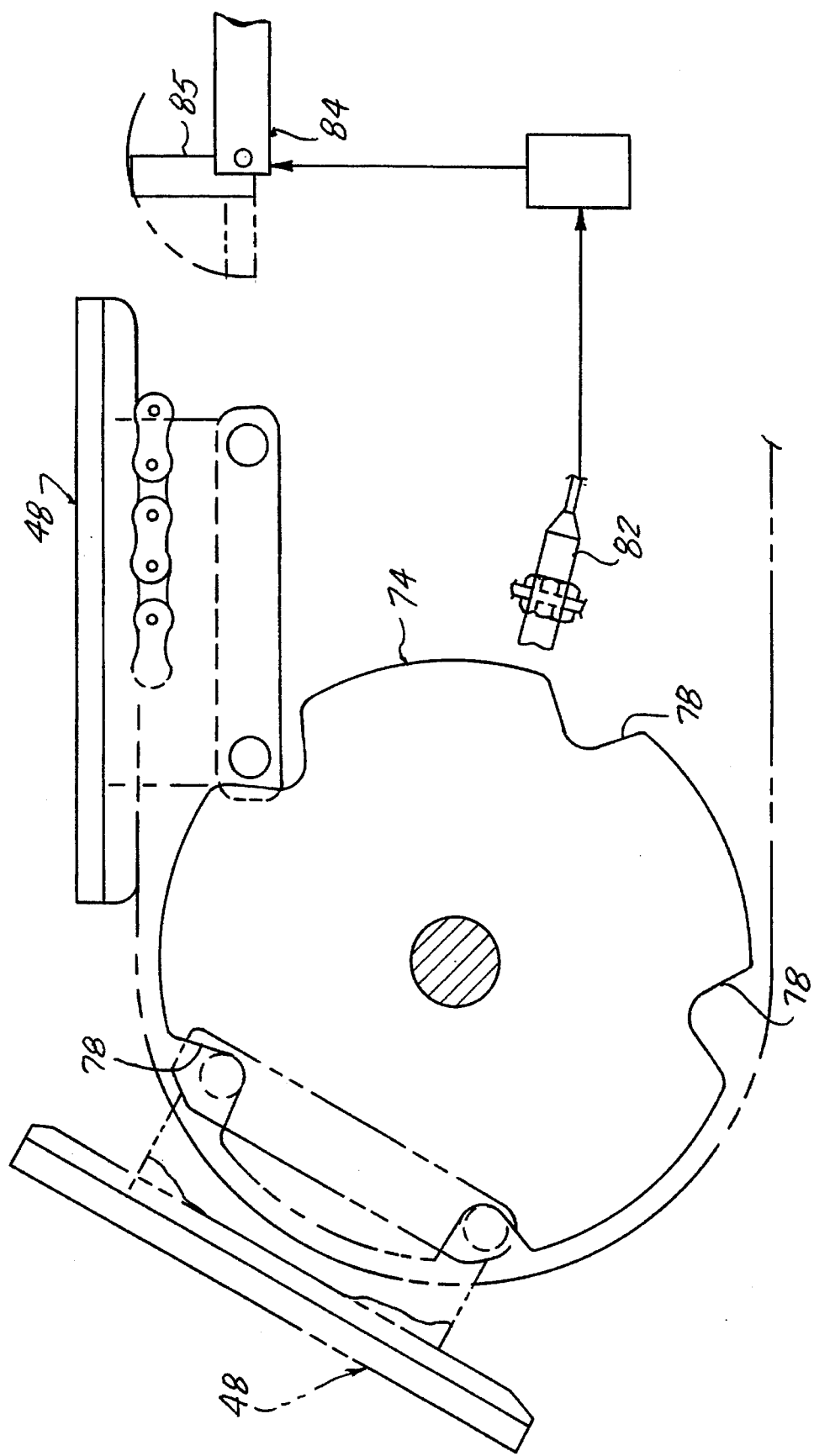
FIG. 10 is a side elevational view of the pallet drive disc and fragmentary view of the associated conveyor drive chain and a pair of pallets being driven thereby with a diagrammatic representation of an associated switching arrangement.

In order to minimize the impacting of the lead drive rollers 76 with the drive disc 74, a control arrangement may be provided in order to insure a release timing of each pallet 48 from a stop mechanism on a conveyor whereat it is held by a pallet stop mechanism, the control arrangement depicted in FIG. 10. This control arrangement comprises a switch 82 associated with the pallet drive disc 74 such as to sense the location of a radiused pocket 78.

The pallet stop mechanism, indicated diagrammatically at 84, includes a stop dog 85 selectively swung to the vertical to engage the stop block 51 on the underside and at the rear of each pallet 48. The stop mechanism 84 is operated by means of a signal generated by the switch 82 such as to release the next available pallet 48 at the point in time at which the radiused pocket 78 will be rotated into alignment with the leading pallet drive roller 76 at the moment the particular pallet 48 advances into contact with the pallet drive roller 76.

Figure 11:
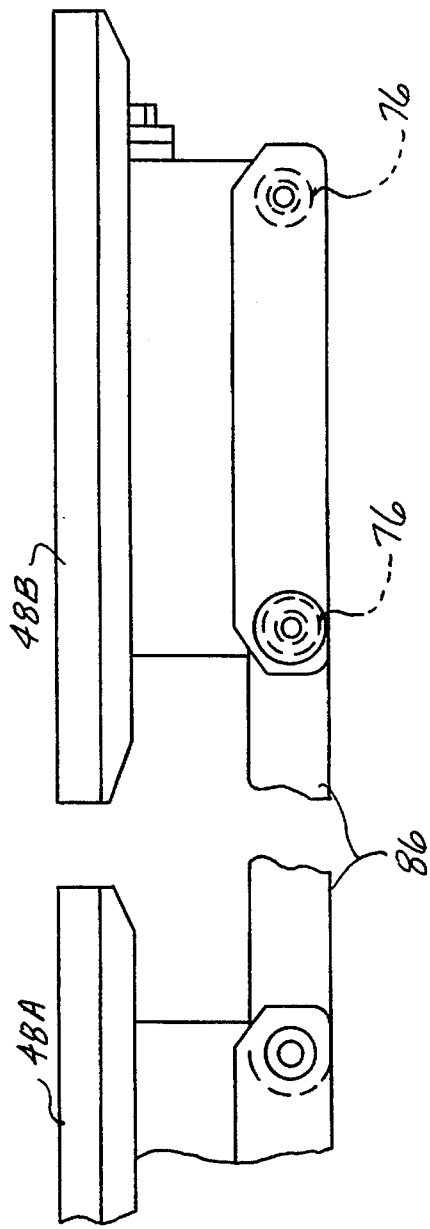
FIG. 11 is a side elevational view of a pair of linked pallets, the lead pallet shown in fragmentary form.
Figure 12:
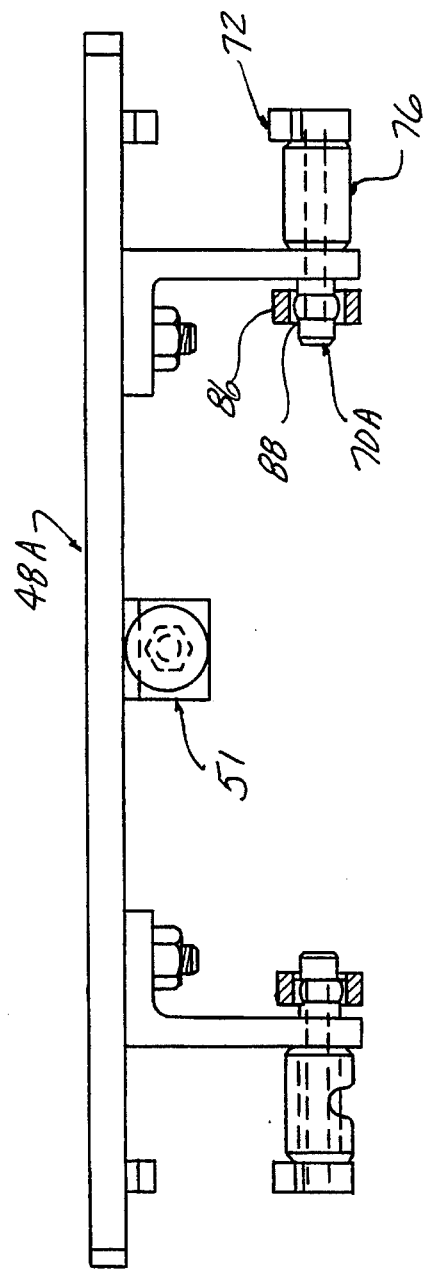
FIG. 12 is an end view in partial section showing the details of the connection of the associated link bars.

The above described arrangement allows linking of two or more pallets into a pallet assembly to allow the use of the conveyor with larger workpieces as shown in FIGS. 11 and 12. In this configuration, the pallet 48A is provided with a linking bar 86 which is received over self aligning bearings 88 mounted on the roller mounting bolt 70A. The spacing of the linking bar 86 is set exactly to the spacing between the front and rear rollers 76 on each pallet, so that the successive linked pallets 48 may be driven by engagement with the pallet drive disc 74. Accordingly, two or more pallets 48 can be linked together such that relatively large sized workpieces can be supported by a series of linked pallets.

Figure 13:
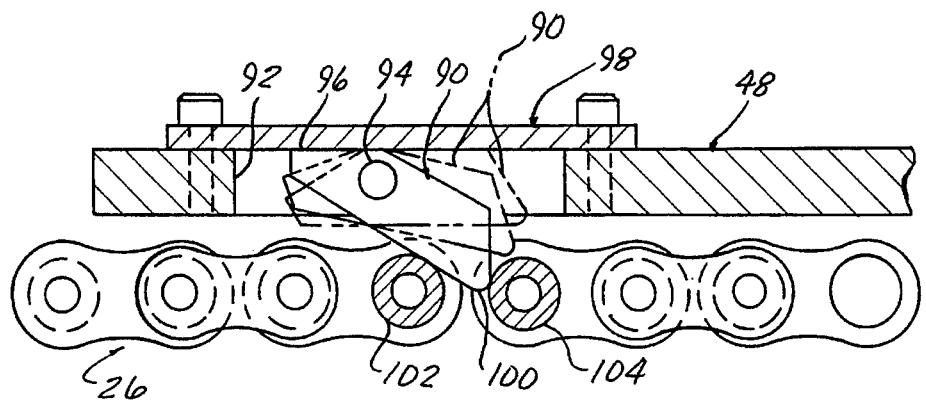
FIG. 13 is a fragmentary enlarged sectional view through a pallet showing an anti-runaway dog installation for use with a declined conveyor.
Figure 14:
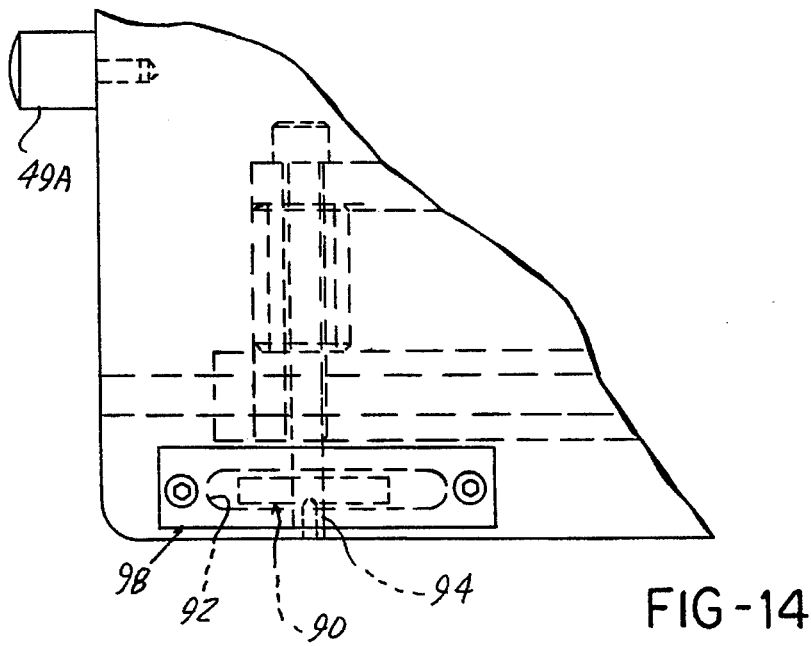
FIG. 14 is a fragmentary plan view of the pallet shown in FIG. 13 on a reduced scale.
Figure 15:
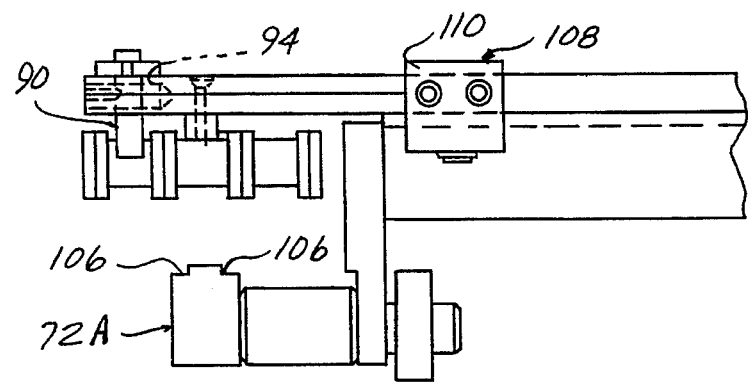
FIG. 15 is a front fragmentary elevational view of the pallet shown in FIG. 13 on a reduced scale, together with a sectional view through the conveyor chain depicting engagement of the anti-runaway dog.

FIGS. 13–15 show variations of certain details for a declined conveyor in which the conveyor is elevated at one end.

In this instance, an anti-runaway dog 90 is pivotally mounted within a slotted recess 92 in the rear corners of each pallet 48. The dog 90 is pivotally mounted by a cross pin 94 extending across the recess 92. The pin location is so as to gravity bias the dog 90 to a down position, in which a rear face 96 bears against the inside of a cover plate 98 fastened to the top of the pallet 48 and an angled nose 100 protrudes between chain link pins 102 and 104. This positively engages the chain with the pallet and holds the pallet from sliding down the chain 26 ahead of its advance.

When a pallet 48 encounters a stop or a next ahead stopped pallet, the chain 26 moves the dog 90 to an elevated position and is allowed to slide beneath the pallet 48.

The lower guide bar 72A may also be reconfigured for a declined installation, so that shoulders 106 engage the links adjacent the center roller strand.

This increases the friction in the return segment insuring that the pallets 48 will ascend the return segment.

A pair of bumpers 49A on either side of the pallet center line and on the front side may be employed for wider pallets. A pair of bumper blocks 108 are attached to the rear edge of the pallets 48. The bumper blocks 108 are preferably of greater thickness than the pallet plate to insure the trailing pallet does not ride up on the leading pallet as the leading pallet dips in going around the drive disc. Also the front face 110 of the bumper blocks 108 are angled back to insure free separation as the leading pallet ultimately lifts away from the trailing pallet.

I claim:

1. An accumulating conveyor comprising:

a conveyor frame extending along the length of said conveyor;

a pair of triple roller strand drive chain loops on each side of said conveyor frame, each triple strand chain loop supported for recirculating movement to advance along an upper region of said conveyor frame and return along a lower region of said conveyor frame;

a pair of chain sprockets rotated about a common axis and located to receive a roller strand of a respective chain loop and guiding said chain through said recirculating movement, each of said drive chain loops passing around a respective sprocket in its recirculating movement;

a series of pallets resting on said drive chain loops in said upper region of said conveyor chain to be frictionally driven thereby;

a pair of pallet drive discs, each having a rim and mounted for rotation about an axis aligned with said chain sprocket axes, each pallet drive disc mounted adjacent to a respective chain sprocket with another roller strand of a respective chain passing over said rim of said pallet drive disc;

a series of circumferentially spaced recesses on each of said pallet drive discs and two side-by-side sets of a lengthwise spaced pair of engagement features on the underside of each of said pallets located to be successively received in recesses of said pallet drive discs as said pallet drive disc rotates, so that said pallets are successively driven by said pallet drive discs to be inverted and deposited on the chain loops in said lower region of said conveyor frame to be frictionally driven in a return path; and means for holding said sets of pallet engagement features in said pallet drive disc recesses by said triple roller strand chain loops in passing around the axis of rotation of said pallet drive discs and sprockets, whereby said pallets are held in being inverted by rotation about said axis.

2. The conveyor according to claim 1 wherein said pallet drive disc rim has a series of pockets recessed into said rim comprising said disc engagement features, and wherein the underside of said pallet is provided with a pair of features spaced along the length thereof comprising said pallet engagement features, said pallet features configured and located to be received successively in successive pockets in said pallet drive disc as said disc is rotated and as said pallet is advanced onto said disc.

3. The conveyor according to claim 2 wherein said features on said pallet comprise a pair of rollers mounted to said underside of said pallet to extend parallel to the axis of rotation of said pallet drive disc and wherein said disc pockets are vee shaped with a radiused bottom configured to receive one of said rollers.

4. The conveyor according to claim 3, wherein a pair of pallet drive discs are provided, each located adjacent a respective chain drive sprocket and spaced so as to be aligned with said inner roller strand of a respective drive chain loop, and wherein two roller pairs are provided on said pallet, each roller pair located on a respective side of said pallet.

5. The conveyor according to claim 4 wherein each pair of said pallet guide bars extend to connect respective pairs of said pallet rollers, said pallet guide bars having curved outer corners aligned with the rim of said pallet drive disc with said pallet rollers fully seated in said pockets of said pallet drive disc.

6. The conveyor according to claim 1 further including a second pallet having spaced engagement features, and a link bar interconnecting said pallets so as to space the trailing feature of one pallet from the leading feature of the next pallet the same distance as the space between said engagement features on each pallet.

7. The conveyor according to claim 1 further including stop means for arresting the movement of said pallet at a predetermined location ahead of said pallet drive disc, and switch means sensing the position of a disc engagement feature and actuating said stop means so that said pallet drive disc engagement feature just rotates into engagement with said pallet engagement feature as said pallet advances to said pallet drive disc after release from said stop means.

8. The conveyor according to claim 1 wherein said means comprise a set of connecting bars connecting each of said pairs of pallet engagement features, said connecting bars aligned with a roller strand of a respective triple roller strand chain loop adjacent said another roller strand passing around said rim of a respective pallet drive disc, said connecting bars having curved contours aligning with said associated pallet drive disc rim with said pallet engagement features received into successive recesses therein.

9. An accumulating conveyor comprising:

a conveyor frame extending along the length of said conveyor;

at least one drive chain loop supported for recirculating movement to advance along an upper region of said conveyor frame and return along a lower region of said conveyor frame;

a drive sprocket rotated about an axis and driving said chain loop through said recirculating movement said drive chain loop passing around said axis in its recirculating movement;

a series of pallets frictionally driven by said drive chain loop;

a pallet drive disc mounted for rotation about an axis, aligned with said drive sprocket axis;

engagement means acting between said pallet drive disc and the underside structure on each of said pallets, said pallets successively engaged by said pallet drive disc as said pallet drive disc rotates, so that said pallets are successively driven by said pallet drive disc to be inverted and deposited on the chain loop to be frictionally driven in a return path;

subgroupings of two or more pallets linked together by self-aligning connecting structure so as to space successively linked pallets the same distance as between linked pallets in each other subgrouping of linked pallets, whereby subgroupings of linked pallets can be driven successively about said pallet drive disc.

10. The conveyor according to claim 9 wherein said self-aligning connecting structure comprises a set of link bars mounted at each end to succeeding pallets by self-aligning bearings.

11. A chain conveyor comprising:

a conveyor frame;

an endless loop of drive chain mounted for recirculation on said conveyor frame and drive means for recirculating said drive chain loop;

a series of pallets resting on said drive chain loop to be frictionally driven thereby;

a dog pivotally mounted on each pallet having a portion tending to be gravity biased into engagement with said drive chain in which said pallet cannot move ahead on said drive chain, whereby said pallet is prevented from running ahead of said drive chain.

12. The conveyor according to claim 11 wherein said dog on each pallet is mounted to be inclined towards said drive chain so as to engage said drive chain but to be driven out of engagement with said chain by said chain recirculating movement whenever said pallet is arrested whereby pallets are prevented from being driven ahead by said drive chain.

13. The conveyor according to claim 12 wherein a slot is formed into said pallet, said dog pivotally mounted in said slot so as to have one end gravity biased to move down to have a tip thereof engage said drive chain.

14. The conveyor according to claim 13 further including a cover over said slot engaged by the other end of said dog when said dog is moved down to engage said chain.

* * * * *

UNITED STATES PATENT AND TRADEMARK OFFICE
CERTIFICATE OF CORRECTION

PATENT NO. : 5,495,933
DATED : March 5, 1996
INVENTOR(S) : Jack D. Gyger

It is certified that error appears in the above-identified patent and that said Letters Patent is hereby corrected as shown below:

Column 2, line 25, "aligned disc is" should be --disc is aligned--.

Signed and Sealed this

Seventh Day of May, 1996

Attest:

BRUCE LEHMAN

Attesting Officer                Commissioner of Patents and Trademarks